(12) United States Patent
Berkey et al.

(10) Patent No.: US 10,429,579 B2
(45) Date of Patent: *Oct. 1, 2019

(54) HIGH CHLORINE CONTENT LOW ATTENUATION OPTICAL FIBER

(71) Applicant: Corning Incorporated, Corning, NY (US)

(72) Inventors: George Edward Berkey, Pine City, NY (US); Dana Craig Bookbinder, Corning, NY (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/444,687

(22) Filed: Feb. 28, 2017

(65) Prior Publication Data

US 2017/0168231 A1 Jun. 15, 2017

Related U.S. Application Data

(62) Division of application No. 14/755,469, filed on Jun. 30, 2015, now Pat. No. 9,618,692.

(Continued)

(51) Int. Cl.
*G02B 6/02* (2006.01)
*G02B 6/036* (2006.01)
(Continued)

(52) U.S. Cl.
CPC ...... *G02B 6/02014* (2013.01); *C03B 37/0183* (2013.01); *C03B 37/01453* (2013.01);
(Continued)

(58) Field of Classification Search
CPC ............ G02B 6/02014; G02B 6/02019; G02B 6/03627
See application file for complete search history.

(56) References Cited

U.S. PATENT DOCUMENTS 5,079,433 A 1/1992 Smith
5,410,567 A 4/1995 Brundage et al.
(Continued)

FOREIGN PATENT DOCUMENTS

CN 103760634 A 4/2014
EP 0181595 A2 5/1985
(Continued)

OTHER PUBLICATIONS

Single Mode Fiber Optics, Jeunhomme, pp. 39-44, Marcel Dekker, New York, 1990.
(Continued)

*Primary Examiner* — Ryan A Lepisto
(74) *Attorney, Agent, or Firm* — Robert L. Carlson

(57) ABSTRACT

An optical fiber having a core comprising silica and greater than 1.5 wt % chlorine and less than 0.5 wt % F, said core having a refractive index $\Delta_{1MAX}$, and a inner cladding region having refractive index $\Delta_{2MIN}$ surrounding the core, where $\Delta_{1MAX} > \Delta_{2MIN}$.

21 Claims, 6 Drawing Sheets

Related U.S. Application Data

(60) Provisional application No. 62/022,926, filed on Jul. 10, 2014.

(51) Int. Cl.
| | |
|---|---|
| *C03B 37/018* | (2006.01) |
| *C03B 37/014* | (2006.01) |
| *C03C 13/04* | (2006.01) |
| C03B 37/012 | (2006.01) |
| C03C 25/106 | (2018.01) |

(52) U.S. Cl.
CPC .. *C03B 37/01815* (2013.01); *C03B 37/01853* (2013.01); *C03B 37/01869* (2013.01); *C03C 13/046* (2013.01); *G02B 6/03627* (2013.01); *C03B 37/018* (2013.01); *C03B 37/01205* (2013.01); *C03B 37/01211* (2013.01); *C03B 37/01262* (2013.01); *C03B 37/01282* (2013.01); *C03B 37/01413* (2013.01); *C03B 37/01433* (2013.01); *C03B 37/01446* (2013.01); *C03B 37/01838* (2013.01); *C03B 2201/08* (2013.01); *C03B 2201/12* (2013.01); *C03B 2201/20* (2013.01); *C03B 2201/24* (2013.01); *C03B 2203/22* (2013.01); *C03B 2203/23* (2013.01); *C03B 2203/24* (2013.01); *C03B 2205/42* (2013.01); *C03B 2207/30* (2013.01); *C03C 13/045* (2013.01); *C03C 25/1061* (2018.01); *C03C 2201/11* (2013.01); *C03C 2201/12* (2013.01); *C03C 2203/54* (2013.01); *C03C 2213/00* (2013.01); *G02B 6/02019* (2013.01)

(56) References Cited

U.S. PATENT DOCUMENTS

| | | | |
|---|---|---|---|
| 6,027,062 A | 2/2000 | Bacon et al. | |
| 6,116,055 A | 9/2000 | Ishikawa et al. | |
| 6,823,125 B2 | 11/2004 | Koumura et al. | |
| 6,917,740 B2 | 7/2005 | Boek et al. | |
| 7,450,806 B2 | 11/2008 | Bookbinder et al. | |
| 7,565,820 B2 | 7/2009 | Foster et al. | |
| 7,832,675 B2 | 11/2010 | Bumgarner et al. | |
| 7,929,818 B1* | 4/2011 | Bickham | G02B 6/02019 |
| | | | 385/124 |
| 8,839,646 B2 | 9/2014 | Haruna et al. | |
| 8,849,084 B2 | 9/2014 | Yang et al. | |
| 9,108,876 B2 | 8/2015 | Dawes et al. | |
| 9,116,279 B2 | 8/2015 | Lingle, Jr. et al. | |
| 9,512,033 B2 | 12/2016 | Hirano et al. | |
| 2002/0097970 A1 | 7/2002 | Sasaoka | |
| 2003/0031441 A1* | 2/2003 | Simons | C03B 37/018 |
| | | | 385/123 |
| 2003/0056549 A1 | 3/2003 | de Sandro et al. | |
| 2003/0079504 A1 | 5/2003 | Boek et al. | |
| 2003/0200770 A1 | 10/2003 | Johnson | |
| 2004/0200241 A1 | 10/2004 | Otosaka et al. | |
| 2004/0240814 A1* | 12/2004 | Boek | C03B 37/01446 |
| | | | 385/123 |
| 2007/0274666 A1 | 11/2007 | Aikawa et al. | |
| 2007/0297735 A1 | 12/2007 | Khrapko et al. | |
| 2008/0050086 A1 | 2/2008 | Bickham et al. | |
| 2008/0285927 A1* | 11/2008 | Khan | C03B 37/01446 |
| | | | 385/123 |
| 2011/0091175 A1 | 4/2011 | Sanders | |

FOREIGN PATENT DOCUMENTS

| | | |
|---|---|---|
| EP | 1107027 A1 | 6/2001 |
| JP | 62176941 | 8/1987 |
| JP | 05024873 | 2/1993 |
| JP | 2882908 | 2/1999 |
| JP | 2004203682 A | 7/2004 |
| WO | 2011069026 A1 | 6/2011 |
| WO | 2011094256 A1 | 8/2011 |
| WO | 2013028513 A1 | 2/2013 |

OTHER PUBLICATIONS

Machine Translation JP2882908.
Butov et al; "Refractive Index Dispersion of Doped Silica for Fiber Optics"; Optics Communications 213 (2002) 301-308.
Matthieu et al; "Fictive Temperature in Silica-Based Glasses and Its Application to Optical Fiber Manufacturing"; Progress in Materials Science, vol. 57, Issue 1, 2012, p. 63-94.
Tomashuk et al; "Principle of Operation of Fibre Optic Dosimeter"; Electronics Letters, 1999, vol. 35, No. 2 pp. 170-171.
International Search Report, issued in connection with corresponding PCT application No. PCT/US2015/039854, dated Oct. 21, 2015.
European Patent Application No. 15742456.5 Office Action dated Jun. 20, 2018; 5 Pages; European Patent Office.
English Translation of CN201580048706.8 First Office Action dated Jan. 10, 2019, China Patent Office.
English Translation of RU2017104234/03 Search Report dated Dec. 14, 2018, Russia Patent Office, 2 Pgs.
English Translation of JP2017501188 Office Action Dated May 8, 2019, Japan Patent Office, 5 Pgs.

* cited by examiner

HIGH CHLORINE CONTENT LOW ATTENUATION OPTICAL FIBER

CROSS-REFERENCE TO RELATED APPLICATIONS

This application is a divisional of and claims priority from and the benefit of U.S. application Ser. No. 14/755,469, filed on Jun. 30, 2015, and entitled "HIGH CHLORINE CONTENT LOW ATTENUATION OPTICAL FIBER," which claims the benefit of U.S. Provisional Application Ser. No. 62/022,926, filed on Jul. 10, 2014, and entitled "HIGH CHLORINE CONTENT LOW ATTENUATION OPTICAL FIBER", the content of which is relied upon and incorporated herein by reference in its entirety.

FIELD

The present invention relates to optical fibers having high chlorine dopant levels in the core of the fiber.

TECHNICAL BACKGROUND

There is a continuing need for lower attenuation optical fibers. Low attenuation is one of the most critical properties in optical fibers. Most optical fibers use germania (GeO2) doped silica for the core region and pure silica for the overclad region. However, the Raleigh scattering due to germania doping limits low fiber attenuation to about 0.18 dB/km for practical fibers due to Rayleigh scattering related to dopant concentration fluctuation. To reduce dopant concentration fluctuation, relatively high silica core fibers have been made which utilize a fluorine doped cladding. These fibers sometimes include small amounts of chlorine. However, these high silica content core optical fibers have high viscosity that increases the Rayleigh scattering due to high fictive temperature in the core. In addition, the fluorine (F) doped cladding has a much lower viscosity, which results in high draw induced stress in the core region. The high stress in the core region reduces the glass relaxation, which increases the Rayleigh scattering loss. In addition, the stress effect reduces the core refractive index through stress-optic effects, making it difficult to achieve the core refractive index change required for making a single mode fiber, therefore even higher amounts (~2x) of fluorine doping in the cladding is required. This higher F-doping makes the silica core and F-doped cladding have even higher viscosity and stress differences, resulting in the fibers being drawn at slow speeds to achieve low attenuation.

SUMMARY

Disclosed herein are optical waveguide fibers which comprise a core comprising silica and greater than or equal to 1.5 wt % chlorine and less than 0.6 wt % fluorine, the core having a refractive index $\Delta_{1MAX}$, and a cladding region having a refractive index $\Delta_{2MIN}$ surrounding the core, where $\Delta_{1MAX} > \Delta_{2MIN}$. The fibers disclosed herein are preferably single moded at 1550 nm. In some embodiments, the fibers disclosed herein may exhibit a 22 m cable cutoff less than or equal to 1260 nm. In some preferred embodiments, the molar ratio of chlorine in the core to fluorine in the cladding is greater than 1, more preferably greater than 1.5. The fibers disclosed herein preferably contain less than 1 weight percent $GeO_2$, and more preferably contain no $GeO_2$. In some preferred embodiments, the core comprises chlorine in an amount greater than 2 weight percent, more preferably greater than 2.5 weight percent, and even more preferably greater than 3 weight percent.

In some embodiments, the core region may be doped with greater than 2.5 wt % chlorine with no fluorine doping in the cladding region. In yet another embodiment, the core region is doped with greater than 3 weight % chlorine with no fluorine doping in the cladding region.

The fiber designs disclosed herein provide a core with equal or lower viscosity than the cladding. This results in reduced stresses within the fiber and correspondingly reduced fiber attenuation, not only because of reduction in the viscosity mismatch but also reduction in the CTE (coefficient of thermal expansion) mismatch. Modeled examples of these fibers have attenuations of about 0.15 dB/Km at 1550 nm, even when drawn at high draw speeds.

The fiber designs disclosed herein are capable of resulting in fibers having optical properties that are G.652 compliant, MFD greater than 8.2 microns at 1310 nm, typically between 8.2 microns and 9.4 microns at 1310 nm, zero dispersion wavelength, $\lambda_0$, of $1300 \leq \lambda_0 \leq 1324$ nm, cable cutoff less than or equal to 1260 nm, and attenuation at 1550 nm $\leq 0.18$ dB/Km, more preferred $\leq 0.17$ dB/Km, even more preferred $\leq 0.16$ dB/Km at 1550 nm, and even more preferred $\leq 0.15$ dB/Km at 1550 nm, and most preferably $\leq 0.14$ dB/Km at 1550 nm.

The fiber designs disclosed herein also include optical fibers having effective area at 1550 nm of larger than 70 $micron^2$. In some embodiments, the effective area at 1550 nm of disclosed fibers is larger than 90 $micron^2$. In other embodiments, the effective area at 1550 nm of disclosed fibers is larger than 110 $micron^2$. In still other embodiments, the effective area at 1550 nm of disclosed fibers is larger than 130 $micron^2$. In some preferred embodiments, optical fibers having effective at 1550 nm area larger than 70 $micron^2$ have cable cutoff less than 1530 nm. In some other preferred embodiments, optical fibers having effective area at 1550 nm larger than 110 $micron^2$ have cable cutoff less than 1530 nm. In still other preferred embodiments, optical fibers having effective area at 1550 nm larger than 130 $micron^2$ have cable cutoff less than 1530 nm. In some other embodiments, optical fibers having effective at 1550 nm area between 70 $micron^2$ and 90 $micron^2$ and a bend loss at 1550 nm of less than 2 dB/turn on a 20 mm diameter mandrel. In some other embodiments, optical fibers having effective at 1550 nm area between 70 $micron^2$ and 90 $micron^2$ and a bend loss at 1550 nm of less than 1 dB/turn on a 20 mm diameter mandrel. In some other embodiments, optical fibers having effective at 1550 nm area between 70 $micron^2$ and 90 $micron^2$ and a bend loss at 1550 nm of less than 0.5 dB/turn on a 20 mm diameter mandrel. In some other embodiments, optical fibers having effective at 1550 nm area between 90 $micron^2$ and 120 $micron^2$ and a bend loss at 1550 nm of less than 3 dB/turn on a 20 mm diameter mandrel. In some other embodiments, optical fibers having effective at 1550 nm area between 120 $micron^2$ and 150 $micron^2$ and a bend loss at 1550 nm of less than 5 dB/turn on a 20 mm diameter mandrel. Also disclosed herein is a method of making an optical fiber, the method comprising providing an optical fiber preform having surface area greater than 10 $m^2/gm$ to a first furnace, and chlorine doping the preform in a first chlorine doping step comprising exposing the preform to an atmosphere containing chlorine at temperatures higher than 1300° C. The first chlorine doping step may comprise exposing the preform to an atmosphere comprising SiCl4, and said method further comprises exposing the preform to atmosphere containing water or oxygen after said first chlorine doping step to further activate the preform, and said method further comprises chlorine doping the preform in a second chlorine doping step in an atmosphere containing chlorine at temperatures higher than 1300° C.

Reference will now be made in detail to the present preferred embodiments, examples of which are illustrated in the accompanying drawings.

DETAILED DESCRIPTION OF THE PREFERRED EMBODIMENT

Figure 1:
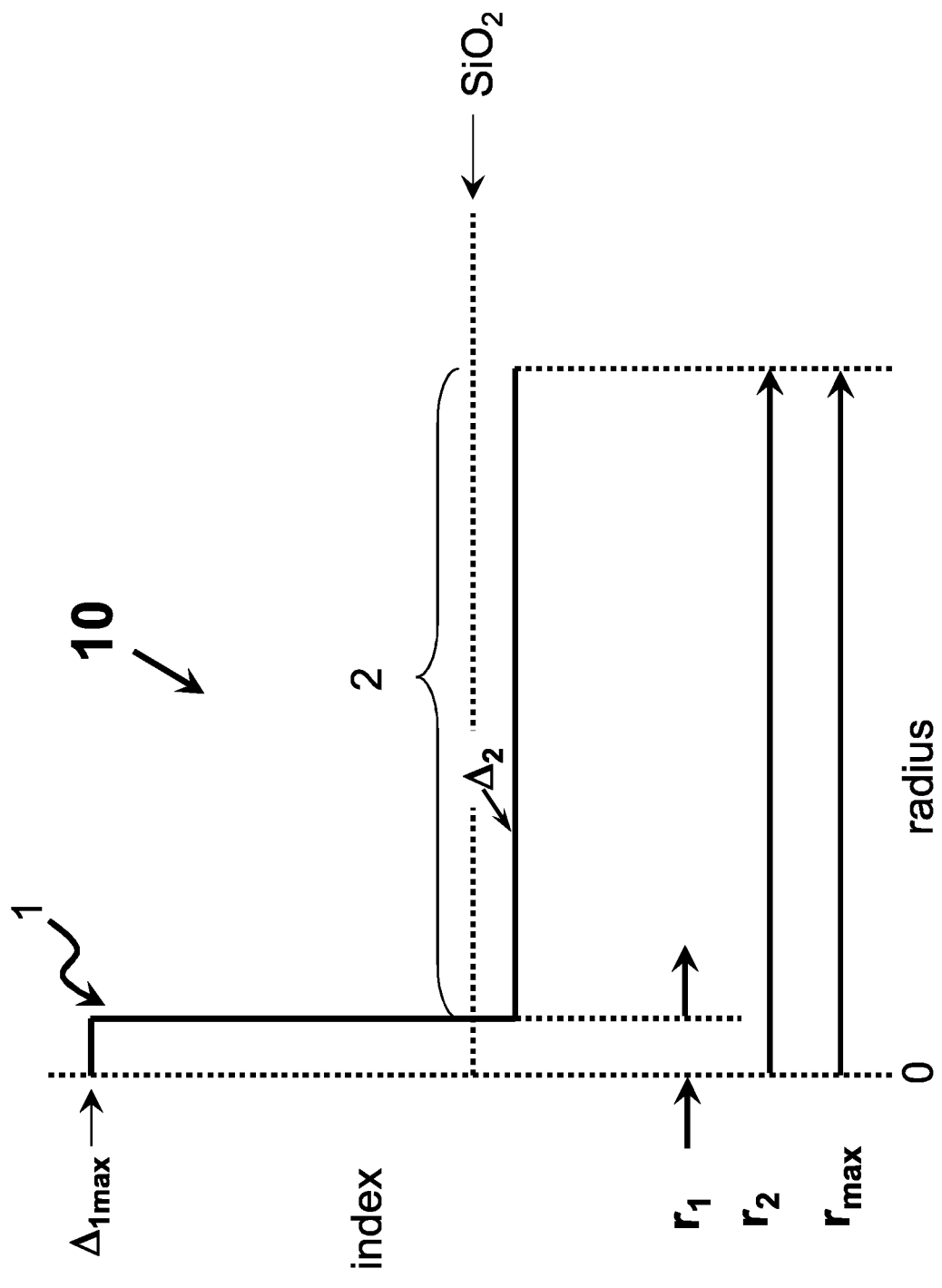
FIG. 1 shows a refractive index profile corresponding to an embodiment of an optical waveguide fiber as disclosed herein.

Additional features and advantages will be set forth in the detailed description which follows and will be apparent to those skilled in the art from the description or recognized by practicing as described in the following description together with the claims and appended drawings.

Low attenuation is one of the most critical properties in optical fibers. Optical fibers disclosed herein are valuable for use as low attenuation optical fibers in optical fiber cables for submarine and terrestrial long haul systems.

The "refractive index profile" is the relationship between refractive index or relative refractive index and waveguide fiber radius. The radius for each segment of the refractive index profile is given by the abbreviations $r_1$, $r_2$, $r_3$, $r_4$, etc. and lower an upper case are used interchangeability herein (e.g., $r_1$ is equivalent to $R_1$).

Unless stated otherwise, the "relative refractive index percent" is defined as $\Delta \% = 100 \times (n_i^2 - n_c^2)/2n_i^2$, and as used herein $n_c$ is the average refractive index of undoped silica glass. As used herein, the relative refractive index is represented by $\Delta$ and its values are given in units of "%", unless otherwise specified. The terms: delta, $\Delta$, $\Delta \%$, $\% \Delta$, delta %, % delta and percent delta may be used interchangeably herein. In cases where the refractive index of a region is less than the average refractive index of undoped silica, the relative index percent is negative and is referred to as having a depressed region or depressed index. In cases where the refractive index of a region is greater than the average refractive index of the cladding region, the relative index percent is positive. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. Examples of updopants include $GeO_2$ (germania), $Al_2O_3$, $P_2O_5$, $TiO_2$, Cl, Br. Examples of down dopants include fluorine.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Zero dispersion wavelength is a wavelength at which the dispersion has a value of zero. Dispersion slope is the rate of change of dispersion with respect to wavelength.

"Effective area" is defined as:

$$A_{eff} = 2\pi (\int f^2 r \, dr)^2 / (\int f^4 r \, dr),$$

where the integration limits are 0 to $\infty$, and f is the transverse component of the electric field associated with light propagated in the waveguide. As used herein, "effective area" or "$A_{eff}$" refers to optical effective area at a wavelength of 1550 nm unless otherwise noted.

The term "α-profile" refers to a relative refractive index profile, expressed in terms of $\Delta(r)$ which is in units of "%", where r is radius, which follows the equation, $$\Delta(r) = \Delta(r_o)(1 - [|r - r_o|/(r_1 - r_o)]^\alpha),$$

where $r_o$ is the point at which $\Delta(r)$ is maximum, $r_1$ is the point at which $\Delta(r) \%$ is zero, and r is in the range $r_i \leq r \leq r_f$, where $\Delta$ is defined above, $r_i$ is the initial point of the α-profile, $r_f$ is the final point of the α-profile, and α is an exponent which is a real number.

The mode field diameter (MFD) is measured using the Peterman II method wherein, $2w = MFD$, and $w^2 = (2\int f^2 r \, dr / \int [df/dr]^2 r \, dr)$, the integral limits being 0 to $\infty$.

The bend resistance of a waveguide fiber can be gauged by induced attenuation under prescribed test conditions, for example by deploying or wrapping the fiber around a mandrel of a prescribed diameter, e.g., by wrapping 1 turn around a either a 6 mm, 10 mm, or 20 mm or similar diameter mandrel (e.g. "1×10 mm diameter macrobend loss" or the "1×20 mm diameter macrobend loss") and measuring the increase in attenuation per turn.

One type of bend test is the lateral load microbend test. In this so-called "lateral load" test (LLWM), a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 Newtons. A 70 Newton force is then applied to the plates and the increase in attenuation in dB/m is measured. The increase in attenuation is the lateral load attenuation of the waveguide in dB/m at a specified wavelength (typically within the range of 1200-1700 nm, e.g., 1310 nm or 1550 nm or 1625 nm).

Another type of bend test is the wire mesh covered drum microbend test (WMCD). In this test, a 400 mm diameter aluminum drum is wrapped with wire mesh. The mesh is wrapped tightly without stretching, and should have no holes, dips, or damage. Wire mesh material specification: McMaster-Carr Supply Company (Cleveland, Ohio), part number 85385T106, corrosion-resistant type 304 stainless steel woven wire cloth, mesh per linear inch: 165×165, wire diameter: 0.0019", width opening: 0.0041", open area %: 44.0. A prescribed length (750 meters) of waveguide fiber is wound at 1 m/s on the wire mesh drum at 0.050 centimeter take-up pitch while applying 80 (+/−1) grams tension. The ends of the prescribed length of fiber are taped to maintain tension and there are no fiber crossovers. The attenuation of the optical fiber is measured at a specified wavelength (typically within the range of 1200-1700 nm, e.g., 1310 nm or 1550 nm or 1625 nm); a reference attenuation is measured on the optical fiber wound on a smooth drum. The increase in attenuation is the wire mesh covered drum attenuation of the waveguide in dB/km at a specified wavelength (typically within the range of 1200-1700 nm, e.g., 1310 nm or 1550 nm or 1625 nm).

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface. The increase in attenuation is the pin array attenuation in dB of the waveguide at a specified wavelength (typically within the range of 1200-1700 nm, e.g., 1310 nm or 1550 nm or 1625 nm).

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Fiber cutoff is measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

By cabled cutoff wavelength, or "cabled cutoff" as used herein, we mean the 22 m cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards.

Unless otherwise noted herein, optical properties (such as dispersion, dispersion slope, etc.) are reported for the LP01 mode.

The fibers disclosed herein preferably exhibit a 22 m cable cutoff less than or equal to 1530 nm, in some embodiments less than or equal to 1400 nm, in some embodiments less than or equal to 1260 nm.

Modeled examples of these fibers have attenuations of about 0.165 dB/Km or less at 1550 nm, even when drawn at high speeds. That is, draw speeds ≥10 m/s, in some embodiments, ≥15 m/s, in some embodiments, ≥25 m/s, in some embodiments, ≥35 m/s and in some embodiments, ≥45 m/s.

In some embodiments, optical fibers disclosed herein may be single moded at 1550 nm and capable of exhibiting an effective area at 1550 nm which is greater than about 55 microns$^2$, in some embodiments between 55 and 150 microns$^2$, in some embodiments between about 65 and 120 microns$^2$. In some preferred embodiments, the effective area at 1550 nm is between about 70 and 95 micron. In some preferred embodiments, the optical fibers may have an effective area at 1550 nm larger than 70 micron$^2$ and also exhibit a cable cutoff less than 1530 nm. In some preferred embodiments, the optical fibers may have an effective area at 1550 nm larger than 110 micron$^2$ and a cable cutoff less than 1530 nm. In some preferred embodiments, the optical fibers disclosed herein may exhibit an effective area at 1550 nm larger than 130 micron$^2$ and a cable cutoff less than 1530 nm. In some embodiments, the optical fibers may have an effective area at 1550 nm area between 70 micron$^2$ and 90 micron$^2$ and a bend loss at 1550 nm of less than 2 dB/turn on a 20 mm diameter mandrel. In some embodiments, the optical fibers may have an effective area at 1550 nm area between 70 micron$^2$ and 90 micron$^2$ and a bend loss at 1550 nm of less than 1 dB/turn on a 20 mm diameter mandrel. In some other embodiments, optical fibers ay have an effective area at 1550 nm area between 70 micron$^2$ and 90 micron$^2$ and a bend loss at 1550 nm of less than 0.5 dB/turn on a 20 mm diameter mandrel. In some other embodiments, the optical fibers may have an effective area at 1550 nm area between 90 micron$^2$ and 120 micron$^2$ and a bend loss at 1550 nm of less than 3 dB/turn on a 20 mm diameter mandrel. In some other embodiments, the optical fibers may have an effective area at 1550 nm area between 120 micron$^2$ and 150 micron$^2$ and a bend loss at 1550 nm of less than 5 dB/turn on a 20 mm diameter mandrel.

One exemplary fiber 10, shown in FIG. 1, includes a central glass core region 1 comprising maximum refractive index delta percent $\Delta_{1MAX}$. A first depressed inner cladding region 2 surrounds central core region 1, the first inner cladding region 2 comprising refractive index delta percent $\Delta_{2MIN}$, where $\Delta_{1MAX} > \Delta_{2MIN}$. Inner cladding region 2 is preferably immediately adjacent to central core glass region 1. Glass core region 1 comprises silica glass, greater than 1.5 wt % chlorine and less than 0.5 wt % fluorine. Glass core region 1 preferably comprises less than 1 weight percent GeO$_2$, and more preferably contains no GeO$_2$. In some embodiments, the glass core region 1 comprises silica glass doped with greater than 2 wt % chlorine. In some other embodiments, the glass core region 1 comprises silica glass doped with greater than 2.5 wt % chlorine. In some other embodiments, the glass core region 1 comprises silica glass doped with greater than 3 wt % chlorine. In still other embodiments, the glass region 1 comprises silica glass doped with greater than 2.5 wt % chlorine and is preferably essentially free of fluorine. Inner cladding region 2 comprises silica doped with fluorine. The term Cl$_{core}$ represents the chlorine dopant amount (mole %) in the core region and the term F$_{inner\ clad}$ represents the fluorine dopant amount (mole %) in the inner clad region.

Central core region 1 comprises an outer radius $r_1$ which is defined as where a tangent line drawn through maximum slope of the refractive index of central core region 1 crosses the zero delta line. In some embodiments core region 1 may comprise greater than 1.5 wt % chlorine and less than 0.6 wt % fluorine, in other embodiments greater than 2.0 wt % chlorine in other embodiments greater than 2.5 wt % chlorine, and in other embodiments greater than 3.0 wt % chlorine. Core region 1 may comprise less than 0.6 wt % fluorine, in some embodiments less than 0.5 wt % fluorine, in some embodiments less than 0.25 wt % fluorine. More preferably, core region 1 is essentially free of fluorine, and most preferably core region 1 contains no fluorine. Core region 1 may be designed to exhibit a maximum refractive index delta percent, $\Delta_{1max}$, between about 0.15% $\Delta$ to about 0.5% $\Delta$, and in some embodiments between about 0.15%$\Delta$ to 0.3% $\Delta$, and in other embodiments between about 0.18%4 to 0.25% $\Delta$. Core radius $r_1$ is between 3 and 10 microns, and in some embodiments between about 3 to 7 microns. Central core region 1 may comprise a single segment, step index profile. In some embodiments, central core region 1 exhibits an alpha greater than 0.5 and less than 200, and in some embodiments greater than 5, in some embodiments greater than 10, and in some embodiments greater than 10 and less than or equal to 100.

In the embodiment illustrated in FIG. 1, inner cladding region 2 surrounds central core region 1 and comprises inner radius $r_1$ and outer radius $r_2$, $r_1$ being defined as above and $r_2$ being defined as where the refractive index profile curve crosses the zero delta line, unless the entire cladding is fluorine doped, in which case outer radius $r_2$ is equal to the outer cladding of the optical fiber. Inner cladding region 2 may comprise greater than 0.15 wt % fluorine, in some embodiments greater than 0.25 wt % fluorine, in some embodiments greater than 0.35 wt % fluorine, and in some embodiments contains less than 1 weight percent fluorine, and in some embodiments greater than 0.35 wt % and less than 0.8 weight percent fluorine. The molar ratio of chlorine in the core region 1 to fluorine in inner cladding region 2 is preferably greater than 1, in some embodiments greater than 1.5, in some embodiments greater than 2, in some embodiments greater than 2.5, and in some embodiments greater than 3.0.

Figure 2:
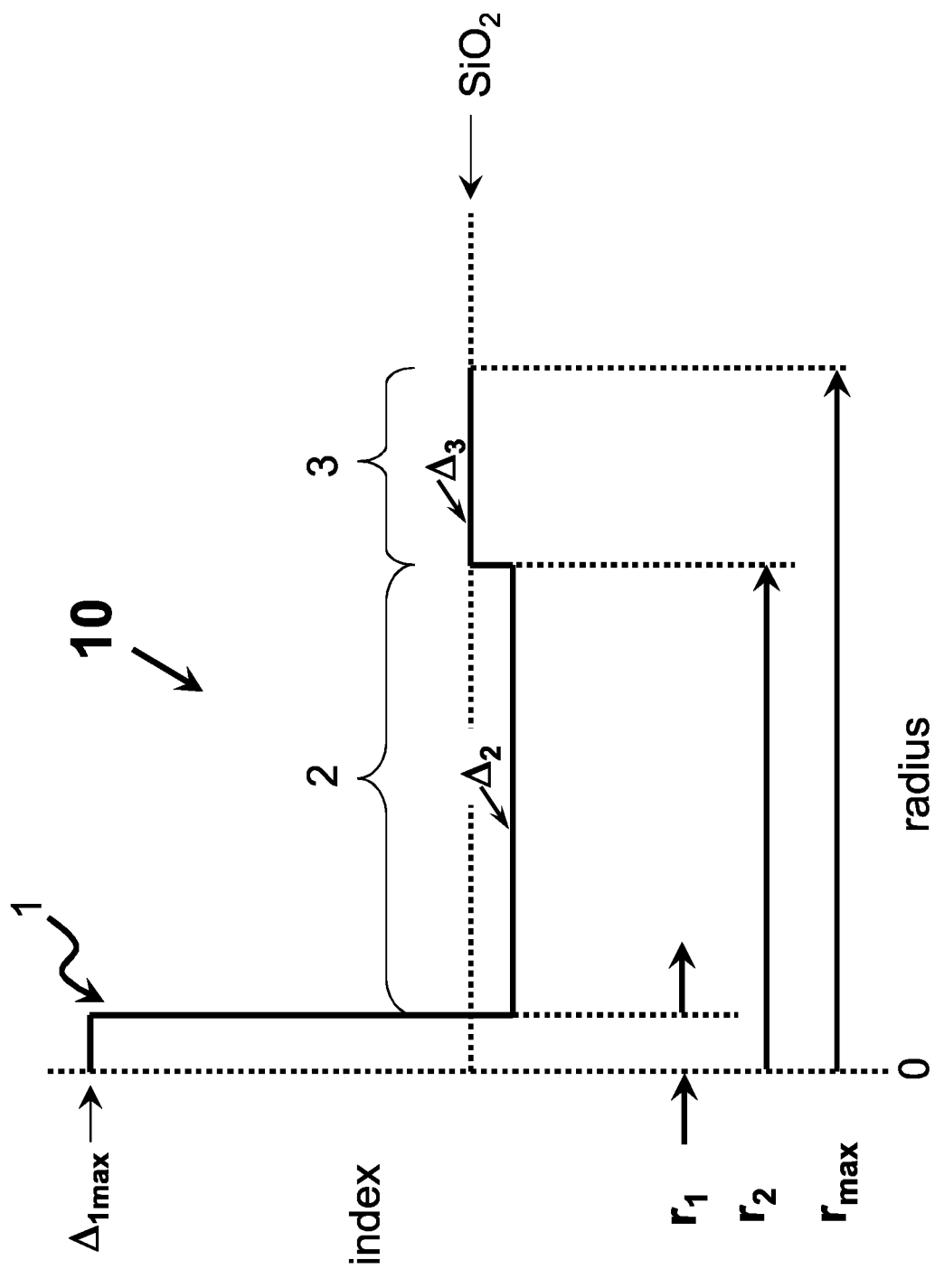
FIG. 2 shows an alternative refractive index profile corresponding to an embodiment of an optical waveguide fiber as disclosed herein.
Figure 3:
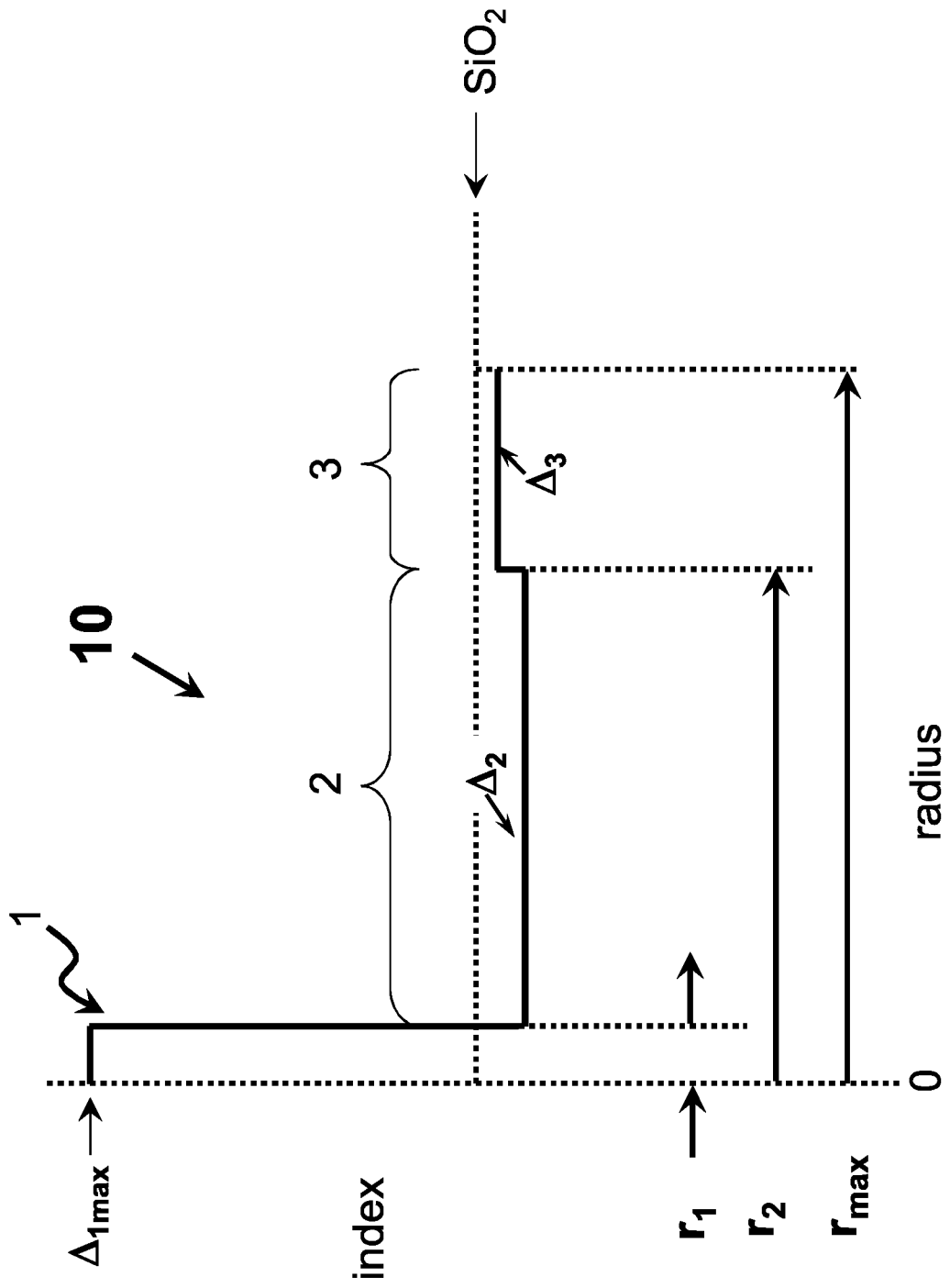
FIG. 3 shows an alternative refractive index profile corresponding to an embodiment of an optical waveguide fiber as disclosed herein.
Figure 4:
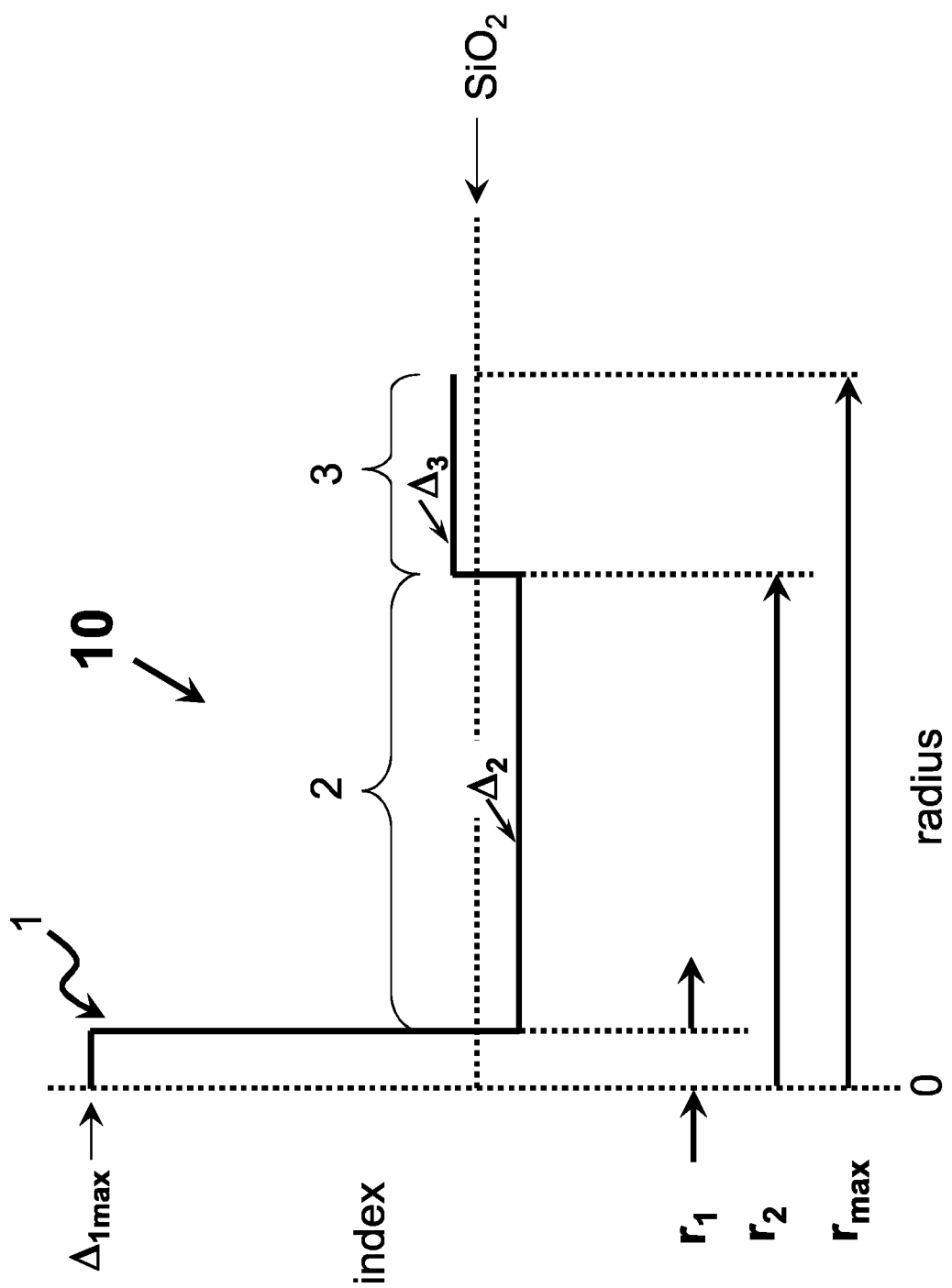
FIG. 4 shows an alternative refractive index profile corresponding to an embodiment of an optical waveguide fiber as disclosed herein.

FIGS. 2-4 illustrate embodiments wherein the fiber comprises an outer cladding region surrounding the inner cladding region, said outer cladding region having average refractive index $\Delta_3$ wherein $\Delta_{1MAX} > \Delta_3 > \Delta_{2MIN}$. The outer cladding has a maximum relative refractive index $\Delta_{3MAX}$. In FIG. 2, the index of refraction of the outer cladding region 3 is equal to that of undoped $SiO_2$, such as may be achieved by using undoped $SiO_2$ as the material for forming the outer cladding layer 3. In FIG. 3, the index of refraction of the outer cladding region 3 is less than that of undoped $SiO_2$, such as may be achieved by using fluorine doped $SiO_2$ as the material for forming the outer cladding layer. In FIG. 4, the index of refraction of the outer cladding region 3 is higher than that of undoped $SiO_2$, such as may be achieved by using SiON doped or chlorine doped $SiO_2$ as the material for forming the outer cladding layer. Thus, as described above, the outer cladding region may be comprised of $SiO_2$ or SiON. In each of these embodiments set forth in FIGS. 2-4, the inner cladding region 2 may exhibit a width ($r_2-r_1$) between about 30 to 52 microns, in some embodiments 40 to 52 microns, and in some embodiments between about 45 to 52 microns. In some embodiments, $R_2$ may be greater than 40, greater than 45 microns, or greater than 50 microns and less or equal to than 62.5 microns, in some embodiments less than or equal to 56 microns or less than or equal to 51 microns.

In FIG. 4, outer cladding region 3 comprises a higher refractive index than inner cladding region 2, and preferably comprises refractive index delta percent $\Delta_3$ which is greater than 0.002, preferably at least 0.005, for example at least 0.01, and may be greater than 0.02 or 0.03 percent delta. Preferably, the higher index portion (compared to inner cladding region 2) of outer cladding region 3 extends at least to the point where the optical power which would be transmitted through the optical fiber is greater than or equal to 90% of the optical power transmitted, more preferably to the point where the optical power which would be transmitted through the optical fiber is greater than or equal to 95% of the optical power transmitted, and most preferably to the point where the optical power which would be transmitted through the optical fiber is greater than or equal to 98% of the optical power transmitted. In many embodiments, this is achieved by having the "updoped" third annular region extend at least to a radial point of about 30 microns. In some embodiments, outer cladding region 3 comprises chlorine (Cl) in an amount greater than 200 ppm when compared to that of the inner cladding region 2, for example greater than 400 or 700 or 1000 ppm or more, and in some embodiments preferably greater than 1500 ppm, and, in some embodiments, greater than 2000 ppm (0.2%) by weight (e.g., 2200 ppm, 2500 ppm, 3000 ppm, 4000 ppm, 5000 ppm, 6000 ppm, 10000 ppm, or there between).

Various exemplary embodiments will be further clarified by the following examples. It will be apparent to those skilled in the art that various modifications and variations can be made without departing from the spirit or scope of the claims.

Table 1 below illustrates modeled comparative fibers 1 and 2 as well as exemplary fibers 1-5, all of which have a core radius of 4.5 microns and a fiber diameter of 125 microns. Comparative fibers 1 and 2 do not have significantly high chlorine content, nor do they have a molar ratio of chlorine in core region 1/fluorine in the inner cladding region 2 of 1 or greater. Consequently, when drawn at a relatively higher draw tensions, e.g. greater than or equal to 100, 120, or 150 grams, due to the stress optic effect a much higher amount of fluorine is needed to achieve a real refractive core to inner cladding refractive index delta of approximately 0.34% Δ. Also set forth in Table 1 are weight percent, mole percent and modeled delta index percent of chlorine in the core region 1; and weight percent, mole percent and modeled delta index percent of fluorine in the inner cladding region 2. Also set forth are the weight percent and mole percent ratios of chlorine in core region 1/fluorine in the inner cladding region 2, as well as the expected core/inner cladding refractive index delta (obtained by adding the absolute magnitude of expected delta index percent of chlorine in the core and the expected delta index percent of fluorine in the inner cladding region) and the real core/inner cladding refractive index delta obtained by drawing the fiber at 120 grams draw tension. Comparative Examples 1 and 2 illustrate that, for a silica core containing 1.1 wt. percent chlorine, rather than merely having to add the 0.74 weight percent fluorine that one would expect to have to add to achieve a 0.34 percent refractive index delta between the core and the fluorine doped inner clad region, in reality because of the stress optic effect, 1.42 weight percent fluorine must be added. Examples 1 through 5 listed in Table 1, all of which exhibit a molar ratio of chlorine in the core region 1 to fluorine in the inner cladding region 2 of greater than 1, illustrate that a much smaller amount of fluorine is needed to be added in the inner cladding region 2 to achieve a real effective index of about 0.34% Δ, after being draw at 120 grams draw tension. Note that in Table 1, the core/clad index delta is the delta achieved by the chlorine doped core region 1 relative to the fluorine doped cladding region 2, unlike the other references herein to refractive index delta.

TABLE 1

| Dopant | parameter | Comparative 1 | Comparative 2 | 1 | 2 | 3 | 4 | 5 |
|---|---|---|---|---|---|---|---|---|
| Chlorine | weight % | 1.1 | 1.1 | 1.8 | 2.0 | 2.5 | 3.0 | 3.4 |
| (Cl) in core | mole % | 1.8 | 1.8 | 2.9 | 3.3 | 4.1 | 4.9 | 5.6 |
|  | delta index, % | 0.11 | 0.11 | 0.18 | 0.20 | 0.25 | 0.30 | 0.34 |
| Fluorine | weight % | 0.74 | 1.42 | 0.72 | 0.61 | 0.39 | 0.19 | 0.00 |
| (F) in clad | mole % | 2.3 | 4.3 | 2.2 | 1.9 | 1.2 | 0.6 | 0.0 |
|  | delta index, % | −0.23 | −0.44 | −0.22 | −0.19 | −0.12 | −0.06 | 0.00 |
| Cl-core, | Cl/F weight ratio | 1.5 | 0.8 | 2.5 | 3.3 | 6.5 | 15.5 | >100 |
| F-Clad | Cl/F mole ratio | 0.8 | 0.4 | 1.3 | 1.7 | 3.5 | 8.3 | >100 |
|  | Core-clad, delta index in preform, % | 0.34 | 0.55 | 0.40 | 0.39 | 0.37 | 0.36 | 0.34 |
|  | Fiber drawn at 120 g tension, delta index in fiber, % | 0.26 | 0.34 | 0.33 | 0.33 | 0.34 | 0.34 | 0.34 |

Examples of modeled chlorine doped (and Cl, GeO2 co-doped) core and fluorine doped clad optical fibers and properties are shown in Table 2. The modeled fibers in Table 2 assume a draw tension of 50 grams. Set forth in Table 2 are delta percent $\Delta_{1max}$ of the core, core alpha, core dopant, weight and mole % Cl in the core, radius $R_1$ of the core, delta percent $\Delta_{2min}$ of the inner cladding, inner cladding dopant, weight and mole % F in the first inner cladding, outer radius $R_2$ of the inner cladding, outer radius of the optical fiber $R_3$, ratio of (Cl in core region 1/F in first clad region 2) in wt. %/wt. % and in mole %/mole %, 22 meter cable cutoff wavelength, zero dispersion wavelength, mode field diameter at 1310 nm, effective area at 1310 nm, dispersion and dispersion slope at 1310 nm, mode field diameter at 1550 nm, effective area at 1550 nm, dispersion and dispersion slope at 1550 nm, and pin array loss, lateral load loss, and attenuation at 1550 nm. The term "na" refers to "not applicable" due to the cutoff wavelength being high enough that the fiber is not single moded at ~1300 nm, and consequently properties are not reported for the 1310 operating window.

TABLE 2

Chlorine doped (and Cl, GeO2 co-doped) core and fluorine doped clad optical fibers and properties.

| Parameter | Example 6 | Example 7 | Example 8 | Example 9 | Example 10 | Example 11 |
|---|---|---|---|---|---|---|
| Delta$_{1max}$ (%) | 0.17 | 0.23 | 0.17 | 0.17 | 0.2 | 0.17 |
| Core alpha | 100 | 100 | 100 | 100 | 100 | 100 |
| Core dopant | Cl | Cl | Cl | Cl | Cl | Cl |
| Cl in core (wt. %) | 1.7 | 2.3 | 1.7 | 1.7 | 2.0 | 1.7 |
| Cl in core (mole %) | 2.8 | 3.8 | 2.8 | 2.8 | 3.3 | 2.8 |
| $R_1$ (microns) | 4.2 | 4.3 | 5.5 | 4.2 | 5.8 | 6.6 |
| Delta$_{2min}$ (%) | −0.17 | −0.1 | −0.1 | −0.17 | −0.05 | −0.1 |
| First clad dopant | F | F | F | F | F | F |
| F in first clad (wt. %) | 0.55 | 0.32 | 0.32 | 0.55 | 0.16 | 0.32 |
| F in first clad (mole %) | 1.7 | 1.0 | 1.0 | 1.7 | 0.5 | 1.0 |
| $R_2$ (microns) | na | na | na | 40 | 50 | 20.9 |
| Delta$_3$ (%) | −0.17 | −0.1 | −0.1 | 0 | 0 | −0.05 |
| Cl in core/F in first clad (wt. %/wt. %) | 3.1 | 7.1 | 5.3 | 3.1 | 12.4 | 5.3 |
| Cl in core/F in first clad (mole %/mole %) | 1.6 | 3.8 | 2.8 | 1.6 | 6.6 | 2.8 |
| Second clad dopant | F | F | F | none | none | F |
| $R_{max}$ (microns) | 62.5 | 62.5 | 62.5 | 62.5 | 62.5 | 62.5 |
| 22 meter cable cutoff (nm) | 1138 | 1149 | 1350 | 1138 | 1372 | 1528 |
| Zero-dispersion wavelength (nm) | 1303 | 1305 | na | 1306 | na | na |
| Mode field diameter @ 1310 nm (microns) | 9.1 | 9.2 | na | 9.0 | na | na |
| Effective area @ 1310 nm (microns$^2$) | 64.9 | 66.7 | na | 64.0 | na | na |
| Dispersion @ 1310 nm (ps/nm/km) | 0.56 | 0.41 | na | 0.33 | na | na |
| Dispersion Slope @ 1310 nm (ps/nm$^2$/km) | 0.0843 | 0.0850 | na | 0.840 | na | na |
| Mode field diameter @ 1550 nm (microns) | 10.3 | 10.5 | 12.0 | 10.3 | 12.5 | 12.9 |
| Effective area @ 1550 nm (microns$^2$) | 81.2 | 83.6 | 113.3 | 80.7 | 122.9 | 135.5 |
| Dispersion @ 1550 nm (ps/nm/km) | 16.9 | 16.9 | 19.8 | 16.6 | 19.9 | 21.1 |
| Dispersion Slope @ 1550 nm (ps/nm$^2$/km) | 0.0567 | 0.0572 | 0.0599 | 0.0566 | 0.0605 | 0.0618 |
| Pin array @1550 nm (dB) | 10.0 | 12.5 | 12.7 | 11.6 | 19.6 | 8.99 |
| Lateral load @1550 nm (dB) | 0.20 | 0.24 | 0.86 | 0.20 | 1.43 | 3.89 |

TABLE 2-continued

Chlorine doped (and Cl, GeO2 co-doped) core and fluorine doped clad optical fibers and properties.

| | | | | | | |
|---|---|---|---|---|---|---|
| Attenuation at 1550 nm, dB/km | 0.16 | 0.15 | 0.16 | 0.16 | 0.15 | 0.16 |
| Macrobend Loss at 1550 nm, 10 mm diameter mandrel (dB/turn) | 10.7 | 11.9 | 13.8 | 10.7 | 19.8 | 6.7 |
| Macrobend Loss at 1550 nm, 15 mm diameter mandrel (dB/turn) | 2.3 | 2.6 | 3.0 | 2.3 | 4.5 | 1.6 |
| Macrobend Loss at 1550 nm, 20 mm diameter mandrel (dB/turn) | 0.48 | 0.55 | 0.66 | 0.48 | 1.02 | 0.38 |
| Macrobend Loss at 1550 nm, 30 mm diameter mandrel (dB/turn) | 0.008 | 0.010 | 0.012 | 0.008 | 0.020 | 0.016 |

| Parameter | Example 12 | Example 13 | Example 14 | Example 15 | Example 16 |
|---|---|---|---|---|---|
| $\text{Delta}_{1max}$ (%) | 0.34 | 0.34 | 0.34 | 0.347 | 0.21 |
| Core alpha | 100 | 100 | 100 | 100 | 2 |
| Core dopant | Cl | Cl + GeO2 (1:1 by index) | Cl + GeO2 (1:1 by index) | Cl | Cl |
| Cl in core (wt. %) | 3.4 | 1.7 | 1.7 | 3.47 | 2.1 |
| Cl in core (mole %) | 5.6 | 2.8 | 2.8 | 5.7 | 3.5 |
| $R_1$ (microns) | 4.2 | 4.45 | 4.9 | 4.95 | 6.0 |
| $\text{Delta}_{2min}$ (%) | 0 | 0 | −0.07 | 0 | −0.2 |
| First clad dopant | none | none | F | none | F |
| F in first clad (wt. %) | 0 | 0 | 0.23 | 0 | 0.64 |
| F in first clad (mole %) | 0 | 0 | 0.7 | 0 | 2.0 |
| $R_2$ (microns) | na | na | 14.8 | 15.4 | 25.4 |
| $\text{Delta}_3$ (%) | 0 | 0 | 0 | 0.07 | −0.13 |
| Cl in core/F in first clad (wt. %/wt. %) | >100 | >100 | 7.5 | >100 | 3.3 |
| Cl in core/F in first clad (mole %/mole %) | >100 | >100 | 4.0 | >100 | 1.8 |
| Second clad dopant | none | none | none | Cl | F |
| $R_{max}$ (microns) | 62.5 | 62.5 | 62.5 | 62.5 | 62.5 |
| 22 meter cable cutoff, nm | 1138 | 1214 | 1388 | 1253 | 1240 |
| Zero-dispersion wavelength (nm) | 1306 | 1301 | 1289 | 1284 | 1305 |
| Mode field diameter @ 1310 nm (microns) | 9.1 | 9.2 | 9.1 | 9.65 | 9.2 |
| Effective area @ 1310 nm (microns$^2$) | 66.2 | 68.0 | 68.6 | 75.9 | 64.7 |
| Dispersion @ 1310 nm (ps/nm/km) | 0.35 | 0.75 | 2.55 | 2.13 | 0.42 |
| Dispersion Slope @ 1310 nm (ps/nm$^2$/km) | 0.0860 | 0.0866 | 0.0881 | 0.0828 | 0.0883 |
| Mode field diameter @ 1550 nm (microns) | 10.3 | 10.4 | 10.0 | 10.7 | 10.5 |
| Effective area @ 1550 nm (microns$^2$) | 80.2 | 83.6 | 80.1 | 90.4 | 82.2 |
| Dispersion @ 1550 nm (ps/nm/km) | 17.0 | 17.5 | 19.6 | 19.1 | 17.6 |
| Dispersion Slope @ 1550 nm (ps/nm$^2$/km) | 0.0576 | 0.0579 | 0.0587 | 0.0593 | 0.0597 |
| Pin array @1550 nm (dB) | 8.2 | 6.2 | 3.6 | 1.358 | 4.2 |
| Lateral load @1550 nm (dB) | 0.21 | 0.20 | 0.13 | 0.15 | 0.22 |
| Attenuation at 1550 nm, dB/km | 0.16 | 0.17 | 0.17 | 0.16 | 0.16 |
| Macrobend Loss at 1550 nm, 10 mm diameter mandrel (dB/turn) | 10.7 | 7.1 | 1.4 | 8.3 | 1.5 |
| Macrobend Loss at 1550 nm, 15 mm diameter mandrel (dB/turn) | 2.3 | 1.4 | 0.3 | 2.0 | 0.4 |
| Macrobend Loss at 1550 nm, 20 mm diameter mandrel (dB/turn) | 0.48 | 0.29 | 0.05 | 0.46 | 0.09 |
| Macrobend Loss at 1550 nm, 30 mm diameter mandrel (dB/turn) | 0.008 | 0.005 | 0.001 | 0.016 | 0.009 |

| Parameter | Example 17 | Example 18 |
|---|---|---|
| $\text{Delta}_{1max}$ (%) | 0.2 | 0.2 |
| Core alpha | 100 | 100 |
| Core dopant | Cl | Cl |
| Cl in core (wt. %) | 2 | 2 |

TABLE 2-continued

Chlorine doped (and Cl, GeO2 co-doped) core and fluorine doped clad optical fibers and properties.

| | | |
|---|---|---|
| Cl in core (mole %) | 3.3 | 3.3 |
| $R_1$ (microns) | 4.04 | 4.2 |
| $Delta_{2min}$ (%) | −0.13 | −0.13 |
| First clad dopant | F | F |
| F in first clad (wt. %) | 0.42 | 0.42 |
| F in first clad (mole %) | 1.3 | 1.3 |
| $R_2$ (microns) | 11.4 | 12.1 |
| Cl in core/F in first clad (wt. %/wt. %) | 4.8 | 4.8 |
| Cl in core/F in first clad (mole %/mole %) | 2.5 | 2.5 |
| $Delta_{2amin}$ (%) | −0.55 | −0.70 |
| Trench dopant | F | F |
| F in trench (wt. %) | 1.8 | 2.3 |
| F in trench (mole %) | 5.5 | 7 |
| $R_3$ (microns) | 16.8 | 15.2 |
| Trench width (microns) | 5.4 | 3.1 |
| $Delta_{3a}$ (%) | −0.13 | −0.13 |
| $R_{3a}$ (microns) | 16.8 | 21.6 |
| Delta3 (%) | −0.13 | 0 |
| Second clad dopant | F | none |
| $R_{max}$ (microns) | 62.5 | 62.5 |
| 22 meter cable cutoff, nm | 1210 | 1254 |
| Zero-dispersion wavelength (nm) | 1306 | 1300 |
| Mode field diameter @ 1310 nm (microns) | 9.0 | 9.2 |
| Effective area @ 1310 nm (microns$^2$) | 63.5 | 67.2 |
| Dispersion @ 1310 nm (ps/nm/km) | 0.11 | 0.95 |
| Dispersion Slope @ 1310 nm (ps/nm$^2$/km) | 0.0835 | 0.0875 |
| Mode field diameter @ 1550 nm (microns) | 10.2 | 10..4 |
| Effective area @ 1550 nm (microns$^2$) | 79.7 | 82.7 |
| Dispersion @ 1550 nm (ps/nm/km) | 17.5 | 18.2 |
| Dispersion Slope @ 1550 nm (ps/nm$^2$/km) | 0.0609 | 0.0596 |
| Pin array @1550 nm (dB) | 9.8 | 6.5 |
| Lateral load @1550 nm (dB) | 0.20 | 0.2 |
| Attenuation at 1550 nm, dB/km | 0.17 | 0.17 |
| Macrobend Loss at 1550 nm, 10 mm diameter mandrel (dB/turn) | 0.17 | 0.40 |
| Macrobend Loss at 1550 nm, 15 mm diameter mandrel (dB/turn) | 0.04 | 0.09 |
| Macrobend Loss at 1550 nm, 20 mm diameter mandrel (dB/turn) | 0.01 | 0.02 |
| Macrobend Loss at 1550 nm, 30 mm diameter mandrel (dB/turn) | 0.002 | 0.002 |

Examples 6 and 7 represent optical fibers having chlorine doped step index core, fluorine doped cladding with the molar ratio of chlorine in the core region 1 to the fluorine in the inner cladding region 2 greater than 1 (i.e., Cl/F>1 by mole) and having optical properties that are compliant with ITU-G.652 standards, with cable cutoff less than 1260 nm, zero dispersion wavelength between 1300 nm and 1324 nm and MFD at 1310 nm between 8.2 microns and 9.5 microns, and macrobend loss at 1550 nm, on a 20 mm and 30 mm diameter mandrel, respectively, of ≤1 and ≤0.01 dB/turn, respectively. Example 9 represents an optical fiber having chlorine doped step index core, fluorine doped cladding with the molar ratio of chlorine in the core region 1 to the fluorine in the inner cladding region 2 greater than 1 (i.e., Cl/F>1 by mole) and having optical properties that are compliant with ITU-G.652 standards and having a stress relieving outerclad silica layer starting at radial position of 40 microns, and macrobend loss at 1550 nm, on a 20 mm and 30 mm diameter mandrel, respectively, of ≤1 and ≤0.01 dB/turn, respectively. Examples 8, 10, and 11 represent optical fibers having chlorine doped step index core, fluorine doped cladding with the molar ratio of chlorine in the core region 1 to the fluorine in the inner cladding region 2 greater than 1 (i.e., Cl/F>1 by mole) that are single moded at 1550 nm and have effective area between 110 micron$^2$ and 150 micron$^2$ and having optical properties that are compliant with ITU-G.654 standards and macrobend loss at 1550 nm, on a 20 mm and 30 mm diameter mandrel, respectively, of ≤1 and ≤0.02 dB/turn, respectively. Examples 12 and 15 represent optical fibers having chlorine doped step index core in excess of 3 weight %, no fluorine doping in the cladding and having optical properties that are compliant with ITU-G.652 standards, with cable cutoff less than 1260 nm, zero dispersion wavelength between 1300 nm and 1324 nm and MFD at 1310 nm between 8.2 microns and 9.5 microns and macrobend loss at 1550 nm, on a 20 mm and 30 mm diameter mandrel, respectively, of ≤0.5 and ≤0.02 dB/turn, respectively. Example 13 represents an optical fiber having a chlorine and GeO2 co-doped step index core, no fluorine doping in the cladding and having optical properties that are compliant with ITU-G.652 standards, with cable cutoff less than 1260 nm, zero dispersion wavelength between 1300 nm and 1324 nm and MFD at 1310 nm between 8.2 microns and 9.5 microns and macrobend loss at 1550 nm, on a 20 mm and 30 mm diameter mandrel, respectively, of ≤0.5 and ≤0.01 dB/turn, respectively. Example 14 represents an optical fiber having a chlorine and GeO2 co-doped step index core, fluorine doping in the inner cladding and having macrobend loss at 1550 nm, on a 20 mm and 30 mm diameter mandrel, respectively, of ≤0.1 and ≤0.003 dB/turn, respectively. Example 16 represents an optical fiber having chlorine doped low alpha core profile, fluorine doped cladding with the molar ratio of chlorine in the core region 1 to the fluorine in the inner cladding region 2 greater than 1 (i.e., Cl/F>1 by mole) and having optical properties that are compliant with ITU-G.652 standards, with cable cutoff less than 1260 nm, zero dispersion wavelength between 1300 nm and 1324 nm and MFD at 1310 nm between 8.2 microns and 9.5 microns, and macrobend loss at 1550 nm, on a 15 mm, 20 mm and 30 mm diameter mandrel, respectively, of ≤0.5, ≤0.1 and ≤0.01 dB/turn, respectively. Examples 16 and 17 represent optical fibers having chlorine doped step index core, fluorine doped cladding with the molar ratio of chlorine in the core region 1 to the fluorine in the inner cladding region 2 greater than 1 (i.e., Cl/F>1 by mole), an fluorine doped trench offset from the core and having optical properties that are compliant with ITU-G.652 standards, with cable cutoff less than 1260 nm, zero dispersion wavelength between 1300 nm and 1324 nm and MFD at 1310 nm between 8.2 microns and 9.5 microns, and macrobend loss at 1550 nm, on a 10 mm, 15 mm, 20 mm and 30 mm diameter mandrel, respectively, of ≤0.5, ≤0.1, ≤0.01 and ≤0.003 dB/turn, respectively.

Examples of manufactured chlorine doped core and fluorine doped clad optical fibers and properties are shown below.

Example 1

A 1 meter long 3000 gram silica soot preform having a density of about 0.5 g/cm$^3$ was prepared in a lathe by flame depositing silica soot onto 10 mm diameter removable alumina rotating bait rod comprising a silica handle. The soot preform was placed into a consolidation furnace and dried at about 1225° C. in an atmosphere comprising about 55 volume percent helium and about 45 volume percent SiCl4. The assembly was then traversed (down-driven) through a hot zone having a peak temperature of about 1500° C. at a temperature ramp rate of about 2.5° C./min, thus producing a fully densified Cl-doped silica glass core preform.

This preform was placed for about 24 hours in an argon purged holding oven set at 1000° C. in order to outgas dissolved helium in the glass. The preform was then placed in a redraw furnace set at about 1900° C., vacuum was applied through the handle to the centerline portion of the preform to collapse the hole in the centerline, and the preform was redrawn to about 8.5 mm diameter 1 meter long void-free Cl-doped silica glass core canes. Microprobe analysis showed the glass had about 1.8 wt. % Cl and was uniform across the diameter of the canes. Index profile of theses canes showed about 0.18% delta index (relative to pure silica) uniform across the diameter of the canes.

Example 2

A 1 meter long 3000 gram silica soot preform having a density of about 0.5 g/cm$^3$ was prepared in a lathe by flame depositing silica soot onto 10 mm diameter removable alumina rotating bait rod comprising a silica handle. The alumina bait rod was removed creating an open centerline hole in the preform (which comprised a silica handle), then an 8.5 mm core cane (comprising a 1.8 wt % Cl-doped silica core from Example 1) was inserted into the centerline hole of the soot preform producing a core-cane soot preform assembly.

The core-cane soot preform assembly was placed into a consolidation furnace and dried at about 1200° C. in an atmosphere comprising helium and about 2.5 volume percent chlorine. Following this step, the soot of the preform assembly was doped with fluorine for 1 hour in an atmosphere comprising helium and about 1 volume percent SiF$_4$; then under these flow rates, the assembly was then traversed (down-driven) through a hot zone having a peak temperature of about 1500° C. at a temperature ramp rate of about 2.5° C./min to fluorine dope the silica soot and collapse the silica soot onto the core cane, thus producing a fully densified void-free glass optical fiber preform having a Cl-doped silica core and a fluorine doped silica cladding.

This preform was placed for about 24 hours in an argon purged holding oven set at 1000° C. in order to outgas dissolved helium in the glass. The preform was then placed in a redraw furnace set at about 1900° C., and the preform was redrawn to about 16 mm diameter 1 meter long void-free Cl-doped silica glass core F-doped silica clad canes. Index profile of theses canes showed about 0.18% delta index core and −0.23% delta index cladding (relative to pure silica).

Example 3

A 1 meter long 16 mm diameter cane from Example 2 was placed on a lathe, then about 3100 grams of silica soot was flame deposited on the cane producing a cane-overclad preform assembly having an overclad soot density of about 0.5 g/cm$^3$. This assembly was placed into a consolidation furnace and dried at about 1200° C. in an atmosphere comprising helium and about 2.5 volume percent chlorine Following this step, the assembly was doped with fluorine for 1 hour in an atmosphere comprising helium and about 1 volume percent SiF$_4$; then under these flow rates, the assembly was then traversed (down-driven) through a hot zone having a peak temperature of about 1500° C. at a temperature ramp rate of about 2.5° C./min to fluorine dope the silica soot and collapse the silica soot onto the core cane. This produced a fully densified void-free glass optical fiber preform having a Cl-doped silica core, a fluorine-doped silica cladding and fluorine-doped silica overcladding.

This preform was placed for about 24 hours in an argon purged holding oven set at 1000° C. in order to outgas dissolved helium in the glass. The preform was then placed in a draw furnace and 125 micron diameter optical fiber was drawn at 15 m/s. The optical fiber had the following optical properties: attenuation at 1310 nm, 1550 nm and 1570 nm of 0.305, 0.169 and 0.165 dB/km, respectively; mode field diameter at 1310 nm and 1550 nm of 8.3 and 9.3 microns, respectively and a 22 meter cable cutoff of 1220 nm.

Figure 5:
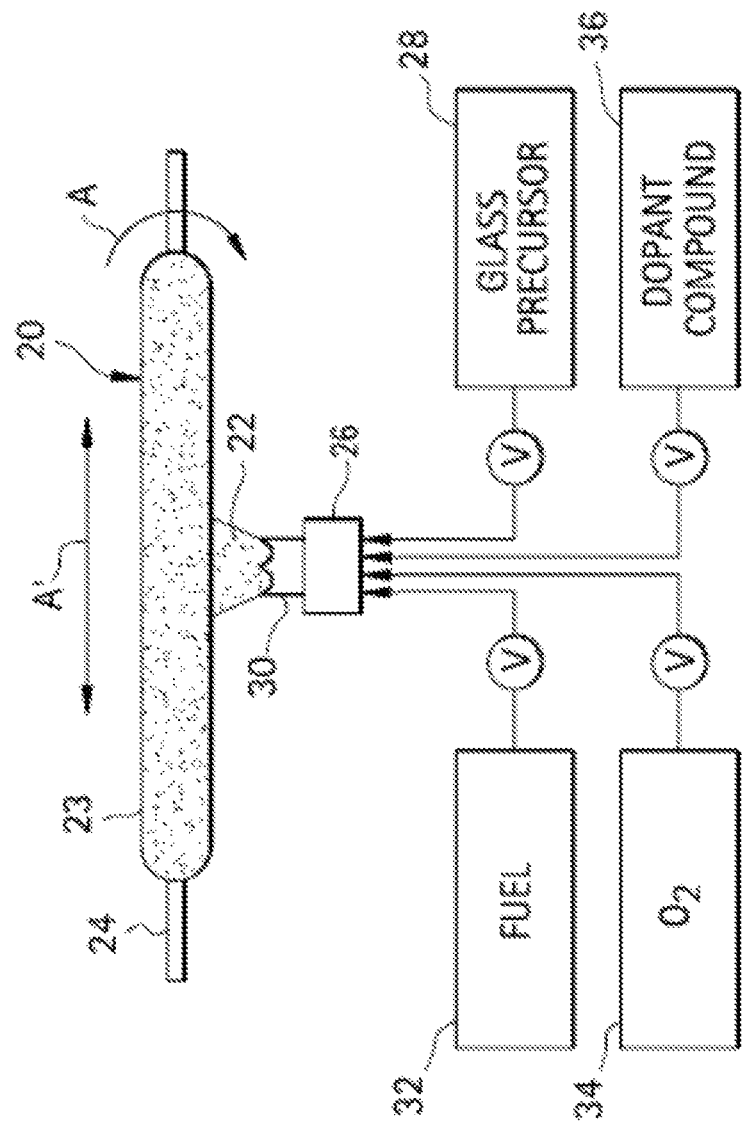
FIG. 5 illustrates a method of depositing silica soot.

Optical fibers disclosed herein can be made using the methods described below which utilize preform consolidation conditions which are effective to result in a significant amount of chlorine being trapped in the core region of the consolidated glass preform. The optical fibers disclosed herein may be manufactured using conventional soot deposition processes such as the outside vapor deposition (OVD) process or the vapor axial deposition (VAD) process, in both cases of which silica and doped silica particles are pyrogenically generated in a flame and deposited as soot. Alternatively, other processes, such as plasma chemical vapor deposition (PCVD) and modified chemical vapor deposition (MCVD), can also be employed which can result in the same or higher chlorine levels in the resultant optical fiber preform and thus, the optical fiber that is drawn therefrom. In the case of OVD, as illustrated in FIG. 5, soot preform 20 is formed by depositing silica-containing soot 22 onto an outside of a rotating and translating mandrel or bait rod 24. This process is known as the OVD or outside vapor deposition process. Mandrel 24 is preferably tapered. The soot 22 is formed by providing a glass precursor 28 in gaseous form to the flame 30 of a burner 26 to oxidize it. Fuel 32, such as methane (CH4), and combustion supporting gas 34, such as oxygen, are provided to the burner 26 and ignited to form the flame 30. Mass flow controllers, labeled V, meter the appropriate amounts of silica glass precursor 28, fuel 32 and combustion supporting gas 34, all preferably in gaseous form, to the burner 26. The glass former compounds 28 are oxidized in the flame 30 to form the generally cylindrically-shaped soot region 23.

Figure 6:
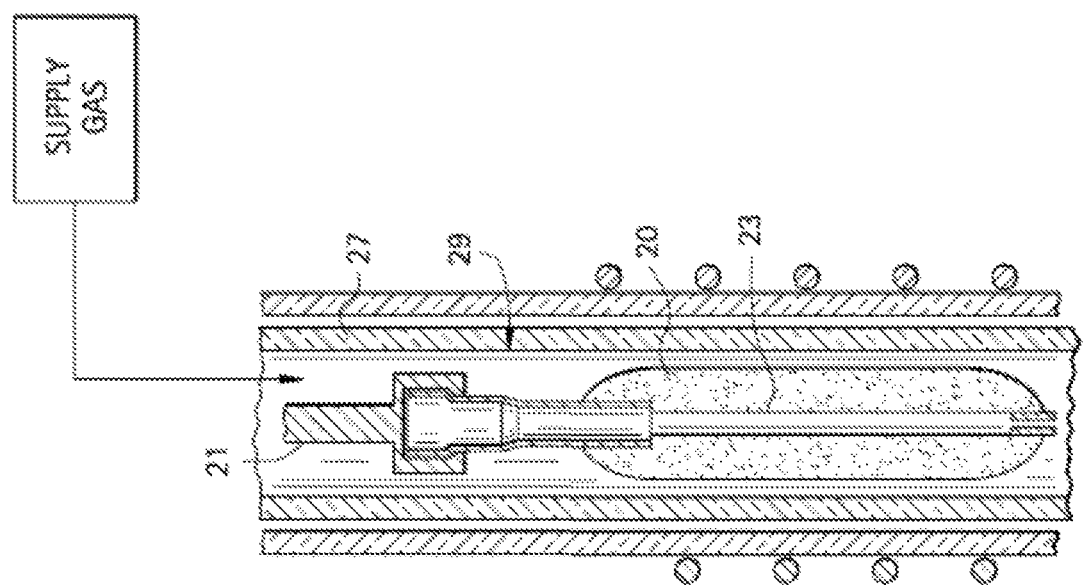
FIG. 6 illustrates an apparatus and method for doping and consolidating a soot preform.

After forming of the silica soot core preform, as illustrated in FIG. 6, the soot core preform 20 including the cylindrical soot region 23 may be chlorine doped and consolidated in consolidation furnace 29 to form a consolidated soot core preform. Prior to consolidation, the mandrel 24 illustrated in FIG. 5 is removed to form a hollow, cylindrical soot core preform. During the chlorine doping and consolidation process, the SiO2 soot core preform 20 is suspended, for example, inside a pure quartz muffle tube 27 of the furnace 29 by a holding mechanism 21. Prior to the consolidation step the preform 20 is exposed to a chlorine containing atmosphere. For example, a suitable chlorine doping atmosphere may include about 0 percent to 70 percent helium and 30 percent to 100 percent chlorine gas, in some embodiments 50 percent to 100 percent chlorine gas, at a temperature of between about 950° C. and 1500° C. and a suitable doping time ranges from about 0.5 and 10 hours.

Using the methods disclosed herein fibers may be made which exhibit chlorine concentrations greater than 1.5 wt % (1.8 mole %), more preferably greater than 2 wt %, more preferably greater than 2.5 wt %, more preferably greater than 3 wt %, more preferably greater than 3.5 wt %, more preferably greater than 4 wt %, more preferably greater than 4.5 wt %, more preferably greater than 5 wt %, which is significantly higher than chlorine levels utilized previously. Such high chlorine levels can be achieved by optimizing of the process variables disclosed herein.

For example, higher temperatures may be used to vaporize $SiCl_4$ liquid, resulting in increased $SiCl_4$ concentration in the vapor phase. The vaporizer temperature in some embodiment is higher than 40° C., in some other embodiments is higher than 45° C., some other embodiments is higher than 50° C. and in yet other embodiments is higher than 57° C. As a result, increased $SiCl_4$ concentration may be employed in the consolidation furnace. In some embodiments, the fraction of the $SiCl_4$ gas through the vaporizer/bubbler to the total flow to the furnace is higher than 30%, in other embodiments, the fraction of the $SiCl_4$ gas through the vaporizer/bubbler to the total flow to the furnace is higher than 50% and in yet other embodiments, the fraction of the $SiCl_4$ gas through the vaporizer/bubbler to the total flow to the furnace is higher than 80%. The remainder of the gas may be helium. In certain other embodiments, the fraction of the $SiCl_4$ gas through the vaporizer/bubbler to the total flow to the furnace is 100%, and preferably remains at as high a percentage as possible, for example 100%, until sintering of the preform is complete. In some embodiments, the chlorine doping step comprises exposing the preform to a partial pressure of $SiCl_4$ greater than 1 atm. In some other embodiments, the chlorine doping step comprises exposing the preform to a partial pressure of $SiCl_4$ greater than 2 atm. In still other embodiments, the chlorine doping step comprises exposing the preform to a partial pressure of $SiCl_4$ greater than 3 atm. or greater than 4 atm. In yet still other embodiments, the chlorine doping step comprises exposing the preform to a partial pressure of $SiCl_4$ greater than 8 atm.

In some embodiments, doping of the preform via exposure to $SiCl_4$ occurs during the sintering process, i.e. the soot preform is being doped prior to and/or up to the point where the soot preform goes to closed pore state and becomes a fully sintered preform, in presence of $SiCl_4$ at temperatures higher than 1300° C., in other embodiments at temperatures higher than 1375° C. In some embodiments the chlorine doping occurs during the sintering process at temperatures higher than 1400° C.

Use of higher soot surface area preforms facilitates higher chlorine doping levels in the preform on exposure of the preform to $SiCl_4$. In some embodiments, the surface area of the soot preform is greater than 10 $m^2/gm$; in other embodiments, the surface area of the soot preform in greater than 20 $m^2/gm$; in yet other embodiments, the surface area of the soot preform in greater than 25 $m^2/gm$; and in still other embodiments, the surface area of the soot preform in greater than 50 $m^2/gm$. In certain other embodiments, the surface area of the soot preform in greater than 90 $m^2/gm$. Surface area of the preform can be measured using BET surface are characterization techniques.

In some embodiments, the soot preform may also comprise greater than 0.5 wt % oxygen depleted silica, i.e. silicon monoxide (SiO). This may be accomplished, for example, by doping the silica glass soot with SiO powder or Si. For example, SiO powder may be doped into a SiO2 soot preform via soot-pressing and/or doping of the SiO2 soot preform with SiO vapor in a furnace. In other embodiments the SiO or Si is doped into a SiO2 soot preform by introducing some amount of SiH4 to a furnace to decompose $SiO_2$ to Si or SiO.

The amount of doped SiCl4 can also be increased by treating silica soot preform with multiple cycles of successive exposure of SiCl4 and H2O/O2 prior to full consolidation of the preform. Without wishing to be bound by theory, it is believed that the treatment of silica soot surface with SiCl4 results in doping of chlorine by attaching —SiCl3 groups at the location of OH groups on silica soot surface (and/or by reacting with the surface SiOSi groups to form an SiCl+ and SiOCl3). Each of the Cl molecule in attached —SiCl3 group can be converted to OH group by treating with water (or oxygen to form another SiO2 molecule on the surface), which then in turn become the reactive sites for attaching additional —SiCl3 groups on subsequent treatment with SiCl4. By exploiting the procedure where the preform is exposed to multiple cycles of successive SiCl4 and H2O (and/or O2) environment, it is possible to create a cascading structure and incorporate high amounts of chlorine on soot particle surface (as an aside, we describe this process as a chemistry fractal). This results in significantly higher chlorine doping levels in the consolidated glass compared to doped chlorine levels reported in prior art.

Other methods can be used to increase the soot surface area of the preform include: 1) low density soot formed using outside vapor deposition 2) pressed high surface area glass soot, and 3) impregnating the glass soot with a sol-gel silica (e.g., tetraethylorthosilicate (TEOS), pre or post hydrolyzed) or nano-particle silica such as Ludox® colloidal silica.

Using the methods outlined herein, in some embodiments the doped chlorine concentration in consolidated glass is higher than 1.5 wt %. In some other embodiments, the doped chlorine concentration in consolidated glass is higher than 2 wt %. In yet other embodiments, the doped chlorine concentration in consolidated glass is higher than 3 wt %.

Gradient sintering may be employed whereby the soot preform 20 is driven down through a hot zone of the furnace 29 which is maintained at a temperature of between about 1225° C. to 1550° C., more preferably between about 1390° C. and 1535° C. For example, the preform may be held in an isothermal zone which is maintained at a desired chlorine doping temperature (950-1250° C.) for a period of time sufficient to enable sufficient doping of chlorine into the preform, after which the soot preform is driven through a zone which is maintained at a desired consolidation temperature (e.g. 1225° C. to 1550° C., more preferably 1390° C. and 1535° C.) at a rate of speed which is sufficient to result in the preform 20 temperature increasing by greater than 1° C./min and at a rate sufficient to form a layer of consolidated glass on the outside of the preform. In one preferred embodiment, the soot containing preform is downfed through a consolidation hot zone at a first downfeed rate, followed by downfeeding of the preform through a second hot zone at a second downfeed rate which is less than that of the first downfeed rate. Such a consolidation technique results in the outside portion of the soot preform sintering before the rest of the preform sinters, thereby facilitating trapping of doping gases by the outer consolidated glass layer, which will in turn facilitate formation of and retaining of chlorine dopant in the resultant consolidated glass. For example, the preform can be exposed to such suitable consolidation temperatures (e.g. greater than about 1390° C.) at a first speed which is sufficient to result in the preform temperature increasing by more than 15° C./min, more preferably greater than 17° C./min, followed by at least a second downfeed rate/consolidation temperature combination which is sufficient to result in the preform heating by at least about 12° C./min but less than 17° C./min, more preferably greater than 14° C./min but less than 15° C./min. Preferably, the first consolidation rate results in the outside of the preform increasing in temperature at a rate which is greater than 2, more preferably greater than 3, and most preferably greater than about 4° C./min higher than the heating rate of the second consolidation rate. If desired, a third consolidation step can be employed which heats at a slower rate (e.g. less than 10° C./min). Alternatively, the soot preform can be sintered at even faster rates by driving the soot preform through a furnace hot zone where the temperature is greater than 1550° C., more preferably greater than 1700° C., even more preferably greater than 1900° C. Alternatively, rather than doping the soot preform and subsequently forming the consolidated outer glass layer as described above, the consolidated outer glass layer could be formed prior to the chlorine doping step, and the chlorine doping can occur via transporting of the dopant gases into the center of the preform. Our ability to dope high levels of chlorine provides significant advantage in making low loss fibers. Chlorine is a dopant that results in low Rayleigh scattering loss by lowering density fluctuations contribution, without increasing concentration fluctuations. In the prior art, optical fibers with cores having chlorine concentrations less than 1.2 wt % have been disclosed. For such designs, fluorine is used in the overclad to provide the index differential between the core and the cladding. However, because of the large viscosity mismatch between the core and the cladding, significant stresses are induced at the draw, which diminish the effective refractive index-differential between the core and the inner cladding region through stress-optic effect and also negatively impact attenuation by impeding the structural relaxation of the glass in the glass transition region. For example, a fiber having 1.1 wt % (1.8 mole %) chlorine in the core and 1.4 wt % (4.4 mole %) fluorine in the adjacent cladding will result in a compositional index differential between the core and the cladding which is 0.505% delta. However, when this fiber is drawn at 150 g tension, the effective index differential in the fiber is greatly diminished due to stress-optic effect and an actual refractive index delta percent of 0.296% delta is achieved. This problem is believe to be due to the core glass being stiffer than the cladding glass, that is the [moles of Cl-core]/[moles F-clad] is less than 1.

In the inventive examples presented here, because of the high chlorine levels in the core, much lower amount of fluorine is needed to obtain the required index differential for core to act as an effective waveguide. Furthermore, the higher level of chlorine doping in the core and lower fluorine content in the clad also results in better viscosity matching of core and cladding and thereby lower stresses and stress-optic impact. For example, using the techniques described herein, a fiber was manufactured having 1.8 wt % (3.0 mole %) chlorine in the core and 0.81 wt % (2.5 mole %) fluorine in the cladding thus having a $Cl_{core}/F_{inner\ clad}$ of 2.2 wt. %/wt. % and 1.2 mole %/mole %. Such a fiber should result in a compositionally based refractive index differential between the core and the cladding which is 0.43% delta. This fiber was drawn at varying tensions of 50, 100 and 150 g, the effective index differential in the fiber is only slightly reduced due to stress-optic effect, with the real effective refractive index delta percent between core and the clad ranging between 0.43% delta and 0.40% delta over the tension range studied. It is also observed that because of the reduction in the stresses in the core due to improved viscosity matching, the core-clad index differential obtained in the fiber is also rather insensitive to the draw tension magnitude. Without wishing to be bound by theory, it is believed that this lower variation between different draw tensions may be due to the core glass being softer than the cladding glass.

After the chlorine doping step, the core soot preform may be sintered. The sintering temperatures employed in the present invention preferably can range from 1100° C. to 1600° C., more preferably between about 1400 and 1550° C., and most preferably between about 1480 and 1550° C. One particularly preferred sintering temperature is approximately 1490° C. Additional information related to manufacturing such void-containing regions within the cladding of the optical fiber can be found, for example, in U.S. patent application Ser. No. 11/583,098, the specification of which is hereby incorporated by reference in its entirety. After sintering the core preform may be drawn to a smaller diameter and cut into lengths to form consolidated chlorine doped glass core canes.

Additional soot which will form the inner cladding region may then be deposited onto the glass core cane using the same method as explained above with respect to the core soot deposition process. The inner cladding soot can then be doped with fluorine using a dopant gas having fluorine or other optical fiber dopants therein. For example, $SiF_4$ and/or $CF_4$ gas may be employed. Such dopant gases may be employed using conventional doping temperatures, for example between about 950 and 1250° C. for 0.25 to 4 hours. The sintering temperatures employed in the present invention preferably can range from 1100° C. to 1600° C., more preferably between about 1400 and 1550° C., and most preferably between about 1480 and 1550° C. One particularly preferred sintering temperature is approximately 1490° C. Additional information related to manufacturing such void-containing regions within the cladding of the optical fiber can be found, for example, in U.S. patent application Ser. No. 11/583,098, the specification of which is hereby incorporated by reference in its entirety.

While the preferred method of making the fibers disclosed herein is via the outside vapor deposition process, the fibers disclosed herein can also be prepared, and the same or higher chlorine levels can be obtained, using other techniques such as MCVD and PCVD. For example, a core glass layer may be deposited, via a PCVD (plasma chemical vapor deposition) process, inside a glass tube which is comprised of SiO2, so that the core glass layer comprises chlorine doped silica having greater than 1.5 wt % chlorine, more preferably greater than 2 wt % chlorine, even more preferably greater than 2.5 wt % chlorine, and even more preferably greater than 3 wt % Cl. The tube can then be collapsed to eliminate the open centerline and thereby forming an optical fiber preform. In some embodiments, a fluorine doped cladding layer may be provided on the fiber preform, either by depositing soot on the outside of said tube and doping with fluorine, or by starting with a silica tube which has already been doped with fluorine. Preferably, as described above, the molar ratio of the chlorine in the core portion to the fluorine in the cladding layer is ≥1.

The fibers disclosed herein may be drawn from optical fiber preforms made using conventional manufacturing techniques and using known fiber draw methods and apparatus, for example as is disclosed in U.S. Pat. Nos. 7,565,820, 5,410,567, 7,832,675, 6,027,062, the specifications of which is hereby incorporated by reference. In particular, optical fiber is pulled from a root portion of the optical fiber preform by a tractor. After leaving draw furnace, the bare optical fiber encounters a diameter monitor (D) which provides a signal that is used in a feedback control loop to regulate speed of the tractor to maintain a constant fiber diameter. The bare optical fiber then passes through a fiber tension measurement device (T) that measures the tension of the optical fiber caused by pulling the fiber from the preform. This tension can increase depending on the speed of the fiber draw, the temperature and viscosity of the root of the preform, etc. One example of a fiber tension measurement device is disclosed in EP 0479120 A2 which is hereby incorporated herein by reference.

In some embodiments, the optical fibers comprise a primary coating having a Young's modulus of less than 1 MPa and a secondary coating having a Young's modulus of greater than 1200 MPa. In some embodiments, the optical fibers comprise a primary coating having a Young's modulus of less than 0.5 MPa and a secondary coating having a Young's modulus of greater than 1500 MPa. In some embodiments urethane acrylate coatings are employed.

It is to be understood that the foregoing description is exemplary only and is intended to provide an overview for the understanding of the nature and character of the fibers which are defined by the claims. The accompanying drawings are included to provide a further understanding of the preferred embodiments and are incorporated and constitute part of this specification. The drawings illustrate various features and embodiments which, together with their description, serve to explain the principals and operation. It will become apparent to those skilled in the art that various modifications to the preferred embodiments as described herein can be made without departing from the spirit or scope of the appended claims.

What is claimed is:

1. A single mode optical fiber comprising:
a core comprising silica and greater than or equal to 1.5 wt % chlorine and less than 0.6 wt % F, said core having a refractive index $\Delta_{1MAX}$, and a cladding region having refractive index $\Delta_{2MIN}$ surrounding the core, where $\Delta_{1MAX} > \Delta_{2MIN}$, and wherein said fiber is single moded at 1550 nm, wherein said cladding region comprises fluorine, and the molar ratio of chlorine in the core to fluorine in the cladding, is greater than 1.

2. The single mode optical fiber of claim 1, wherein said core comprises greater than 2 wt % chlorine.

3. The single mode optical fiber of claim 1, wherein said core is free of fluorine.

4. The single mode optical fiber of claim 1, wherein said fiber is free of fluorine.

5. The single mode fiber of claim 1, wherein said cladding comprises an inner cladding comprising fluorine and an outer cladding region surrounding the inner cladding region, said outer cladding region having refractive index, $\Delta_3$, wherein, $\Delta_{1MAX} >, \Delta_3 >, \Delta_{2MIN}$.

6. The single mode optical fiber of claim 5, wherein the inner cladding has an outer radius greater than or equal to about 12 microns.

7. The single mode optical fiber of claim 5, wherein said outer cladding comprises SiON.

8. The single mode optical fiber of claim 7, wherein an inner radius of the outer cladding is positioned greater than or equal to about 12 microns.

9. The single mode optical fiber of claim 7, wherein the inner radius of the outer cladding is positioned greater than or equal to about 12 microns to less than or equal to about 55 microns.

10. The single mode optical fiber of claim 1, wherein said cladding comprises from greater than or equal to about 0.1 weight % fluorine to less than or equal to about 1 weight % fluorine.

11. The single mode optical fiber of claim 1, wherein the core has a maximum relative refractive index, $\Delta_{1MAX}$, from greater than or equal to about 0.15% to less than or equal to about 0.5%.

12. The single mode optical fiber of claim 11, wherein the core has a radial thickness from greater than or equal to about 3 microns to less than or equal to about 7 microns.

13. The single mode optical fiber of claim 1, wherein the single mode optical fiber has an attenuation of less than or equal to about 0.18 dB/km at a wavelength of 1550 nm.

14. The single mode optical fiber of claim 1, wherein the single mode optical fiber has an attenuation of less than or equal to about 0.17 dB/km at a wavelength of 1550 nm.

15. The single mode optical fiber of claim 1, wherein the single mode optical fiber has an attenuation of less than or equal to about 0.16 dB/km at a wavelength of 1550 nm.

16. The single mode optical fiber of claim 1, wherein the single mode optical fiber has an effective area at 1550 nm of greater than or equal to about 70 microns$^2$.

17. The single mode optical fiber of claim 1, wherein the single mode optical fiber has an effective area at 1550 nm of greater than or equal to about 90 microns$^2$.

18. The single mode optical fiber of claim 1, wherein the single mode optical fiber has an effective area at 1550 nm of greater than or equal to about 130 microns$^2$.

19. The single mode optical fiber of claim 1, wherein the single mode optical fiber has an effective area at 1550 nm of between 70 and 90 microns$^2$ and a bend loss of less than 1 dB/turn at 1550 nm on a 20 mm diameter mandrel.

20. The single mode optical fiber of claim 1, wherein the single mode optical fiber has an effective area at 1550 nm of between 70 and 90 microns$^2$ and a bend loss of less than 0.5 dB/turn at 1550 nm on a 20 mm diameter mandrel.

21. The single mode optical fiber of claim 1, wherein the single mode optical fiber has an effective area at 1550 nm of between 90 and 110 microns$^2$ and a bend loss of less than 2 dB/turn at 1550 am on a 20 mm diameter mandrel.

\* \* \* \* \*

UNITED STATES PATENT AND TRADEMARK OFFICE
CERTIFICATE OF CORRECTION

PATENT NO. : 10,429,579 B2
APPLICATION NO. : 15/444687
DATED : October 1, 2019
INVENTOR(S) : George Edward Berkey et al.

Page 1 of 1

It is certified that error appears in the above-identified patent and that said Letters Patent is hereby corrected as shown below:

In the Claims

In Column 22, Line 27, Claim 1, delete "cladding, is" and insert -- cladding is --, therefor.

In Column 23, Line 24, Claim 21, delete "am" and insert -- nm --, therefor.

Signed and Sealed this
Eighteenth Day of February, 2020

Andrei Iancu
*Director of the United States Patent and Trademark Office*